United States Patent
Gallant et al.

(10) Patent No.: US 8,936,215 B2
(45) Date of Patent: Jan. 20, 2015

(54) AIRCRAFT INCLUDING FLOOR SUPPORT CROSS-MEMBERS WITH BEARINGS INCLUDING A FLEXIBLE MATERIAL CONNECTING THE CROSS-MEMBER TO THE SUPPORT

(75) Inventors: Guillaume Gallant, Lareole (FR); Romain Delahaye, Colomiers (FR)

(73) Assignee: Airbus Operations (S.A.S), Toulouse (FR)

( * ) Notice: Subject to any disclaimer, the term of this patent is extended or adjusted under 35 U.S.C. 154(b) by 34 days.

(21) Appl. No.: 13/321,688

(22) PCT Filed: May 28, 2010

(86) PCT No.: PCT/FR2010/051032
§ 371 (c)(1),
(2), (4) Date: Nov. 21, 2011

(87) PCT Pub. No.: WO2010/136734
PCT Pub. Date: Dec. 2, 2010

(65) Prior Publication Data
US 2012/0061513 A1    Mar. 15, 2012

(30) Foreign Application Priority Data
May 28, 2009    (FR) ...................................... 09 53514

(51) Int. Cl.
*B64C 1/18* (2006.01)
*B64C 1/06* (2006.01)

(52) U.S. Cl.
CPC .. *B64C 1/18* (2013.01); *B64C 1/061* (2013.01)
USPC .......................... 244/119; 244/131; 244/118.1

(58) Field of Classification Search
USPC ............... 244/119, 117 R, 118.1, 118.2, 131; 280/124.177
See application file for complete search history.

(56) References Cited

U.S. PATENT DOCUMENTS

| | | | | |
|---|---|---|---|---|
| 2,472,724 A | * | 6/1949 | Pevney | 244/129.1 |
| 3,251,489 A | * | 5/1966 | Davidson | 410/79 |
| 3,420,470 A | * | 1/1969 | Meyer | 244/173.3 |
| 3,632,065 A | * | 1/1972 | Rosta | 244/17.11 |
| 3,912,206 A | * | 10/1975 | Jong | 248/615 |
| 4,543,762 A | * | 10/1985 | Halvorsen | 52/660 |
| 5,176,339 A | * | 1/1993 | Schmidt | 244/54 |
| 6,158,690 A | * | 12/2000 | Wadey et al. | 244/17.27 |
| 6,199,798 B1 | * | 3/2001 | Stephan et al. | 244/129.4 |

(Continued)

FOREIGN PATENT DOCUMENTS

| | | |
|---|---|---|
| EP | 0 101 235 | 2/1984 |
| EP | 1 614 624 A1 | 1/2006 |

(Continued)

OTHER PUBLICATIONS

Written Opinion of the International Searching Authority issued in International Application No. PCT/FR2010/051032 dated Aug. 4, 2010.

(Continued)

*Primary Examiner* — Tien Dinh
*Assistant Examiner* — Steven Hawk
(74) *Attorney, Agent, or Firm* — Oliff PLC

(57) ABSTRACT

An aircraft including: at least one floor cross-member; at least one support carrying the cross-member; and at least one bearing including at least one flexible material and connecting the cross-member to the support.

17 Claims, 3 Drawing Sheets

(56) References Cited

U.S. PATENT DOCUMENTS

| | | | |
|---|---|---|---|
| 7,191,982 B2* | 3/2007 | Vetillard et al. | 244/119 |
| 7,252,298 B2* | 8/2007 | Hughes | 280/124.128 |
| 7,338,013 B2* | 3/2008 | Vetillard et al. | 244/117 R |
| 7,475,850 B2* | 1/2009 | Vetillard et al. | 244/117 R |
| 7,775,478 B2* | 8/2010 | Wood et al. | 244/119 |
| 2004/0041362 A1 | 3/2004 | Hughes | |
| 2006/0226288 A1* | 10/2006 | Vetillard et al. | 244/119 |
| 2007/0262551 A1* | 11/2007 | Hughes | 280/124.128 |
| 2009/0321569 A1* | 12/2009 | Schroeer et al. | 244/119 |
| 2011/0001006 A1* | 1/2011 | Delahaye et al. | 244/118.5 |
| 2011/0001008 A1* | 1/2011 | Delahaye et al. | 244/119 |
| 2011/0011978 A1* | 1/2011 | Haack et al. | 244/119 |

FOREIGN PATENT DOCUMENTS

| | | |
|---|---|---|
| FR | 2 915 173 | 10/2008 |
| WO | WO 02/21012 A1 | 3/2002 |
| WO | WO 2007/033640 A1 | 3/2007 |

OTHER PUBLICATIONS

International Search Report issued in International Patent Application No. PCT/FR2010/051032 dated Aug. 4, 2010 (with translation).

Preliminary Search Report issued in French Patent Application No. FR 0953514 dated Jan. 29, 2010 (with translation).

* cited by examiner

AIRCRAFT INCLUDING FLOOR SUPPORT CROSS-MEMBERS WITH BEARINGS INCLUDING A FLEXIBLE MATERIAL CONNECTING THE CROSS-MEMBER TO THE SUPPORT the invention relates to he structure of aircraft.

In the present application, a conventional orthogonal frame of reference X, Y, Z is used in which the directions X and Y are horizontal, while the direction Z is vertical. The direction X is the longitudinal direction of the fuselage of the aircraft, while the direction Y is its transverse direction.

In an aircraft, it is known to support the floor of the fuselage by means of cross-members extending in the direction Y. The fuselage comprises frames of generally circular shape that are plane and spaced apart from one another along the direction X. Each cross-member is fastened via its ends to one of the frames. Each cross-member also rests on vertical posts, themselves fastened to low portions of the frames. This provides an assembly that is rigid and robust.

Nevertheless, such an arrangement presents drawbacks. The loads carried by the floor generate bending moments at the junctions between the cross-members and the frames, the bending moments acting on the frames about the axis X. The stresses that appear in the structure in the airplane while in flight also generate a shear force at the same location acting in the direction Y. These stresses give rise respectively to shear in the part providing the connection between the cross-member and the frame, and to flattening or crushing of said part on one side. These various stresses make it necessary to reinforce the part in question, thereby penalizing the weight and the cost of making the airplane.

An object of the invention is to improve the support of the floor in the aircraft in this respect.

To this end, the invention provides an aircraft that comprises:

at least one floor cross-member;
at least one support carrying the cross-member; and
at least one bearing including at least one flexible material and connecting the cross-member to the support.

It should be understood that in this context the material of the bearing is more flexible than the material(s) forming the cross-member and the support.

Thus, the flexibility of the material makes the bearing deformable, thereby enabling the cross-member to move relative to the support. This ability to move reduces the transmission of moments about the axis X and also the transmission of shear forces along the direction Y. Furthermore, it is the flexible material of the bearing that is subjected to the bending and shear stresses and to the flattening forces.

Furthermore, the bearing runs no risk of seizing over time. A bearing that comprises only movable and rigid parts runs the risk of seizing as the parts suffer wear and dirt becomes inserted between them. In the long run, such seizing gives rise to noise from the connection between the cross-member and the support, which is disagreeable for the occupants of the aircraft. In addition, such seizing would give rise to a risk of the moving parts jamming and then breaking prematurely.

In addition, because of the flexible material, and regardless of the shape of the bearing, the connection between the parts is similar to that provided by a ball joint. This applies even if the bearing is not mounted to be movable relative to the other parts. The bearing can thus accommodate shear stresses in any of the directions X, Y, and z, and also flattening forces in those three directions. This serves to off-load the other parts from all of these stresses.

It should also be observed that these advantages persist even if the cross-member and/or the support become deformed as a result of them being stressed elsewhere.

The properties of relative moveability between the cross-member and the support, and the ability of the bearing to accommodate stresses are greater or smaller depending on the type of flexible material constituting the bearing.

Furthermore, interposing such a bearing limits the transmission of vibration between the part, thereby applying frequency filtering to vibration. This serves to improve comfort on board the aircraft in terms of vibration and noise.

The material is preferably elastic.

Thus, the parts return to their original positions after they have been moved and/or deformed in relative manner, in particular once they are no longer stressed.

For example, the material is an elastomer.

Advantageously, the flexible material being a first material, the bearing includes at least one insert made of a second material interposed between two layers of the first material, the second material being more rigid than the first material.

Such an insert serves to reinforce the bearing and to adjust its mechanical properties as a function of the initially selected flexible material.

Advantageously, the or each insert extends over a portion only of a turn around a main axis of the bearing.

It is thus possible to give the bearing properties that are different in certain zones or in certain radial directions, in order to adapt it better to the expected stresses.

More generally, provision may be made for the bearing to be configured in such a manner as to present different, elasticities in at least two directions that are radial relative to a main axis of the bearing.

Advantageously, the bearing presents an annular shape, in particular a cylindrical shape.

Such a shape is particularly propitious for enabling the bearing to accommodate bending moments that act about the axis defined by the annular shape.

Preferably, the bearing presents an axis defined by the annular shape, which axis extends in a horizontal direction perpendicular to a general direction of the cross-member.

Thus, the bearing is particularly adapted to absorbing bending moments about the axis X.

Advantageously, the aircraft has two concentric rings between which the bearing is interposed, the rings being connected respectively to the cross-member and to the support, with one of the two rings preferably forming a housing for receiving the bearing.

Advantageously, at least one of the support and the cross-member includes a vertical wall parallel to a general direction of the cross-member and whereby it is connected to one of the support and the cross-member.

This arrangement enables the assembly to be mounted in simple manner, in particular when it is desired to enhance the absorption of moments about the axis X.

Preferably, each of the support and the cross-member includes a wall of this type, the two walls presenting faces for connection to the bearing, both of which extend in the same direction.

This arrangement further facilitates making the assembly.

In an embodiment, the support comprises a frame connected to the cross-member at least one end of the cross-member, and preferably at both ends.

In another embodiment that is compatible with the preceding embodiment, the support comprises at least one post connected to the cross-member at a distance from the ends of the cross-member.

Preferably, the bearing is arranged to collapse when the intensity of stress on the bearing in a longitudinal direction of the cross-member exceeds a predetermined "dynamic" threshold, said threshold being greater than a "static" threshold predetermined as a maximum for said magnitude under normal circumstances of use of the aircraft.

In the event of a crash, this collapse leads to prior absorption of energy in the bearing, thereby delaying deformation of the fuselage section and thus improving the behavior of the structure under such circumstances.

Other characteristics and advantages of the invention appear further from the following description of various embodiments given as non-limiting examples and with reference to the accompanying drawings, in which.

Figure 1:
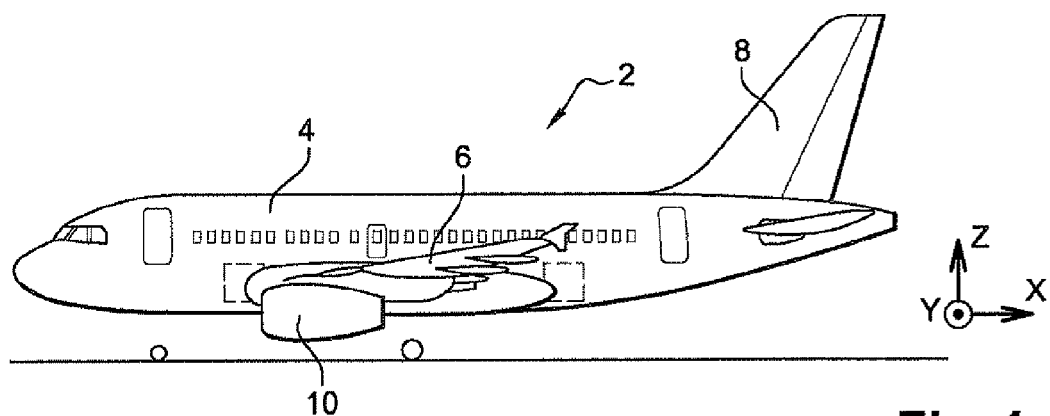
FIG. 1 is a side view of an airplane of the invention.

With reference to FIG. 1, the aircraft 2 of the invention is specifically an aerodyne, and in the present invention an airplane. It comprises a fuselage 4, two wings 6, a tail 8, and engines 10, there being two of them in this example.

Over the major fraction of its length, the fuselage 4 is cylindrical in shape with a vertical cross-section that is circular. The longitudinal axis of the fuselage corresponds to the axis of the cylinder and is parallel to the direction X.

Figure 2:
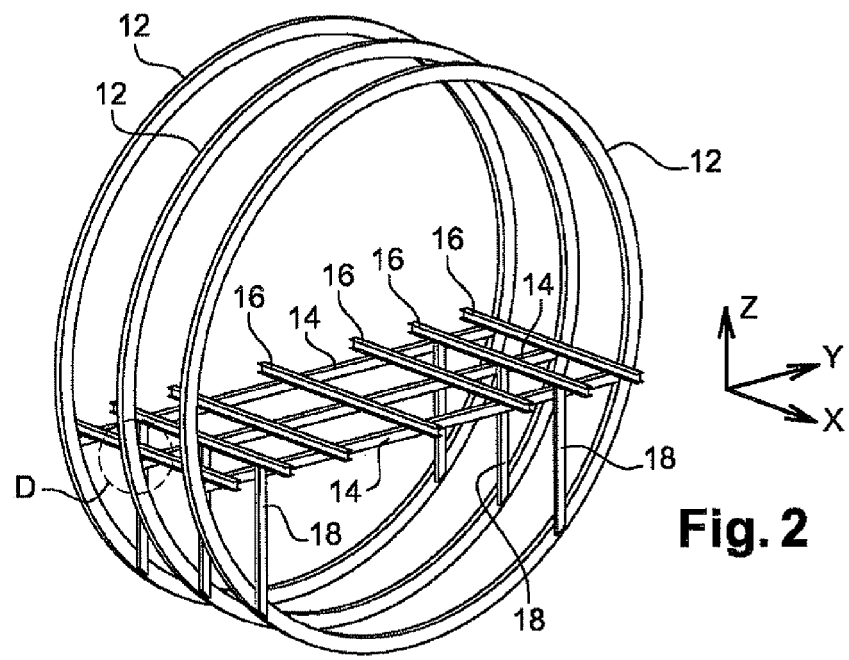
FIG. 2 is a perspective view of a portion of the structure of the fuselage of the FIG. 1 airplane.
Figure 3:
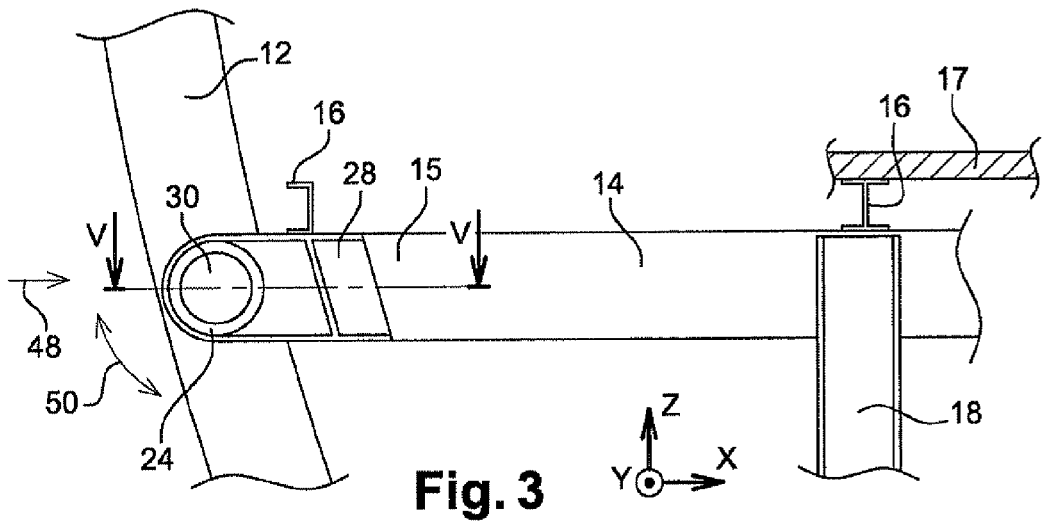
FIG. 3 is a face view showing a detail D of the FIG. 2 structure.
Figure 4:
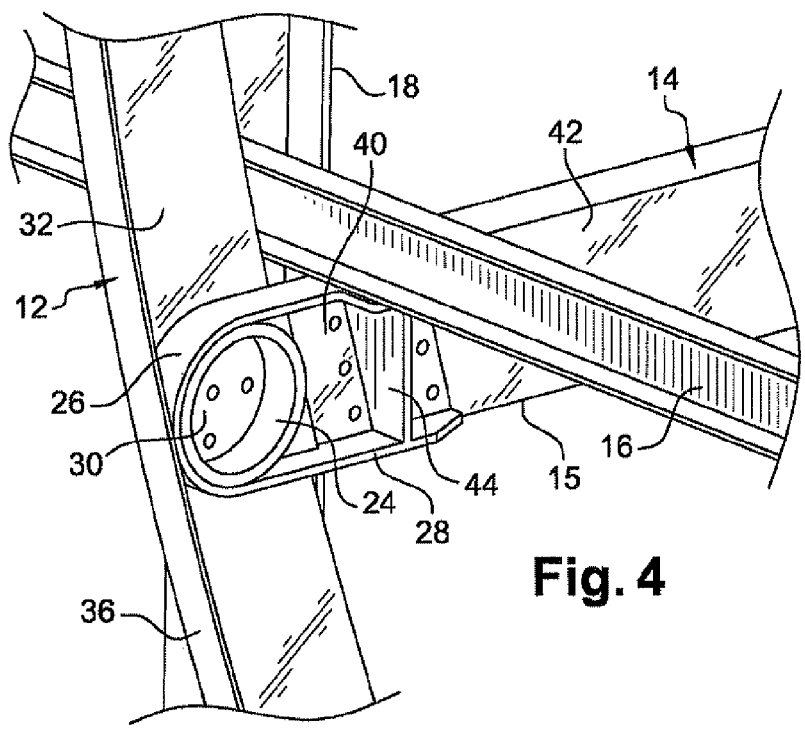
FIG. 4 is a perspective view of the elements shown in FIG. 3.
Figure 5:
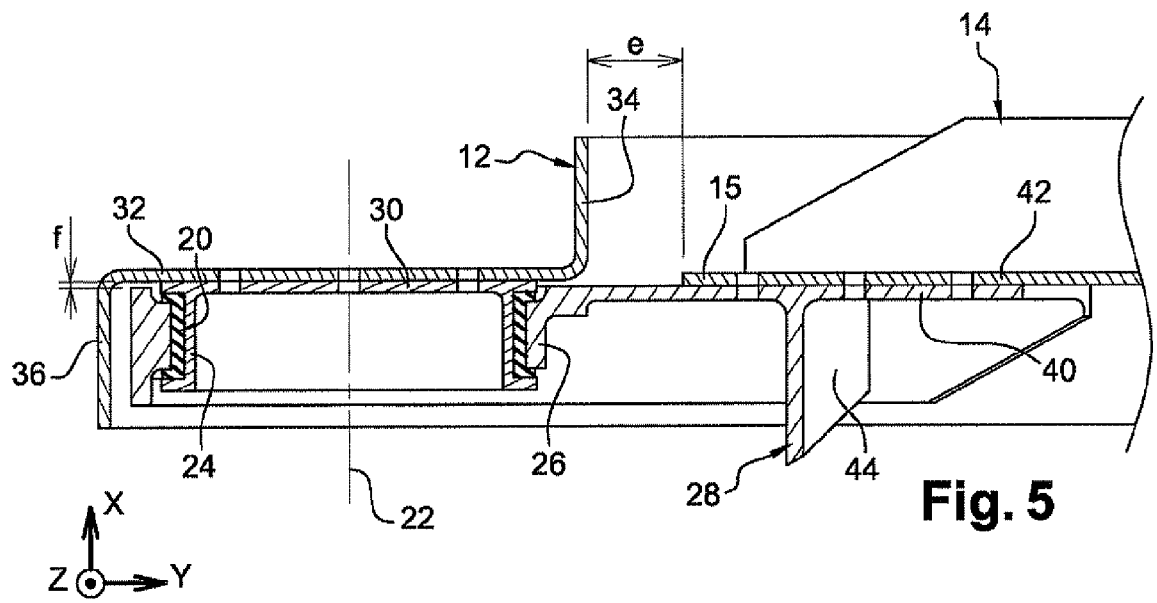
FIG. 5 is a section view on plane V-V of the elements shown in FIG. 3.

The fuselage structure includes in particular frames 12 that are visible in FIG. 2. The frames are identical to one another. Each of them presents a generally circular shape, e.g. a trilobed shape, is plane, and presents circular symmetry about the longitudinal central axis of the fuselage. The frames occupy successive planes that are perpendicular to the direction X. They share a common axis and they face one another, being spaced apart from one another.

The structure also includes horizontal cross-members 14 formed by straight section-member beams extending along the direction Y. The cross-members occupy a common horizontal plane, and they are spaced apart from one another, facing one another.

The structure also includes straight rails 16 that are parallel to the direction X. The rails are spaced apart from one another and they are supported by the cross-members, each rail being supported by a plurality of the cross-members 14. The aircraft has a floor 17 supported by the rails 16. By way of example, passenger seats (not shown) are fastened to the rails 16 through the floor 17.

The structure also includes straight vertical section-member posts 18. Each cross-member 14 is associated with its own two posts 18, each having a top end fastened to the cross-member and a bottom end fastened to the frame 12 that already supports the ends of the cross-member. Each post is connected to the cross-member at a distance from the ends of the cross-member.

In the present embodiment, for each cross-member, the structure includes a bearing 20 at each end 15 of the cross-member, which bearing is made of flexible material and connects the cross-member 14 to the frame 12. The material of the bearing is soft and deformable, and in the present example, it is elastic. This material is more flexible, more elastic, more deformable, and softer than each of the materials forming the cross-member 14 and the frame 12. These are made of metal. The material of the bearing in this example is an elastomer, e.g. presenting stiffness lying in the range 10 kilonewtons per millimeter (kN/mm) to 150 kN/mm. This stiffness is preferably selected as a function of the shape of the bearing.

In this example, the bearing 20 is generally in the form of a cylindrical annulus defining a main axis 22 parallel to the direction X. Specifically, it is in the form of a body of revolution about the axis 22. The main section of the bearing in a plane extending radially to the axis 22 is generally U-shaped, with the free ends of the branches of the U-shape being directed away from the axis 22.

The structure includes for each bearing 20 an inner ring 24 and an outer ring 26, the outer ring being defined by a holder part 28.

The inner ring 24 presents a generally cylindrical annular shape in the form of a body of revolution about the axis 22. Its main section is likewise generally U-shaped with the free ends of the branches of the U-shape being directed away from the axis 22. This section thus defines a peripheral groove of the ring 24 that receives the bearing 20. The ring 24 also includes a wall or cheekplate 30 of plane shape that closes one of the faces of the ring. By means of this cheekplate 30, the ring 24 is rigidly fastened to a wall 32 of the frame 12, this wall 32 itself being plane and perpendicular to the direction X.

Each frame 12 also has two cylindrical walls, an inner wall 34 and an outer wall 36 that extends from the edges of the wall 32, respectively towards the rear and towards the front of the aircraft.

The cheekplate 30 is rigidly fastened to the wall 32 with which it makes surface-against-surface contact. By way of example, this fastening is provided by rivets (not shown) engaged in orifices in the frame and in the ring.

The outer ring 26 is also in the form of a cylindrical annulus forming a body of revolution about the axis 22. The ring 26 presents a portion in relief in its main radial section that penetrates between the branches of the U-shape formed by the bearing 20. The bearing 20 is thus held against the bottom of the groove formed by the inner ring 24 by virtue of the pressure exerted in that direction by the portion in relief on the outer ring 26. The bearing thus makes surface-against-surface contact firstly with the inner ring and secondly with the outer ring, with each of the contact interfaces being cylindrical in shape.

The holder part 28 forming the ring 26 is extended towards the center of the fuselage and of the cross-member. It thus comprises a cheekplate 40 of plane shape perpendicular to the direction X whereby it comes into surface-against-surface contact with a wall 42 of the cross-member, which wall is likewise perpendicular to the direction X. The cheekplate 40 is rigidly fastened to the wall 42, e.g. by means of rivets passing through these two walls.

A space e is provided in the direction Y between the cross-member 14 and the frame 12. Similarly, a space f is arranged in the direction X between the holder part 28 and the frame 12, in particular facing the wall 32.

The inner ring 24 and the holder part 28 are fastened to respective faces of the frame and of the cross-member that are mutually parallel and that extend in the same direction, here towards the front of the fuselage.

In the present example, it can be seen that the inner ring 24 and the frame 12 are rigidly fastened to the bearing. Similarly, the part 28 and the cross-member 14 are rigidly fastened to the bearing. It is only by means of the bearing material deforming that the cross-member 14 can move relative to the frame 12.

Because of this possibility of deformation, a ball joint type connection is established between the cross-member 14 and the frame 12 at each of the ends of the cross-member 14. The bearing 20 absorbs all or part of the flattening stresses 48 that these two parts exert against each other in the direction Y. Similarly, it absorbs all or part of the shear stresses generated by bending moments 50 about the axis X and that might appear between these two parts. Since it is a ball joint, the shear stresses due to moments about the axes Y and Z are also absorbed in full or in part. Because of the material that constitutes the bearing, this connection does not present substantial wear over time. The presence of the material forming the bearing 20 also serves to perform frequency filtering and reduction of the vibration and noise perceived inside the cabin of the airplane 2. As can be seen, by being received in the housing defined between the inner and outer rings, the bearing 20 is to a large extent protected from external elements, and in particular from being dirtied.

In the present example, provision is made for one of the rails 16 to extend over the junction between the holder part 28 and the cross-member 14 in contact with both of those parts. For this purpose, the holder part is reinforced by a plane rib 44 extending in a plane perpendicular to the direction Y.

In the other embodiments as described below, characteristics that are not described again should be assumed to be unchanged.

Figure 6:
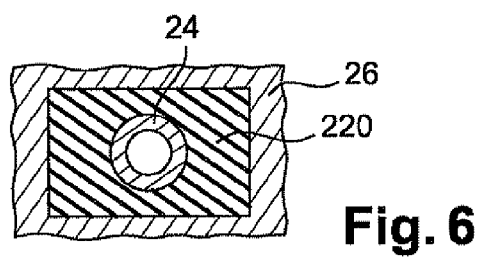
FIGS. 6 to 8 are views analogous to FIG. 3 showing other embodiments.

FIG. 6 shows a second embodiment in which only the inside face of the annular bearing 220 presents a section that is circular in shape. Its outside face presents a section that is rectangular in shape. The inside face of the outer ring 26 thus likewise presents a section that is rectangular in shape, while the inner ring 24 presents a cylindrical shape of circular section. This combination of shapes increases the volume of the bearing between the two rings and makes it even more effective in absorbing flattening forces in the direction Y and also in the other directions. It is also capable of better absorbing shear stresses generated by bending moments about each of the three axes X, Y, and Z.

Figure 7:
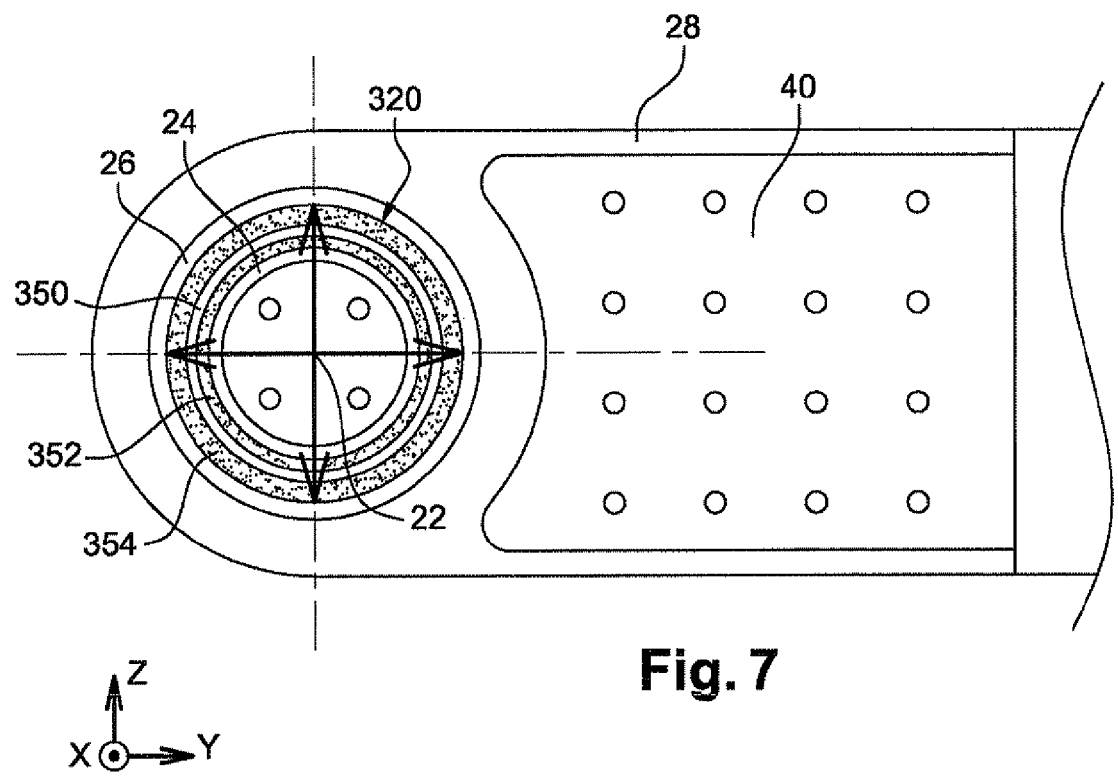

FIG. 7 shows a third embodiment. Here the bearing 320 situated between the inner and outer rings 24 and 26 includes an insert 350, in addition to the flexible elastomer material. In this example, the insert is made of metal, but it could also be made of composite material, e.g. a plastics material reinforced by glass fibers. The insert is embedded in the elastomer material in this example.

The insert 350 is cylindrical in shape, having a circular section in a plane parallel to the YZ plane. There can be thus be seen three superposed layers in this order along the direction extending radially to the axis 22 between the two rings:
  an inner layer 352 of elastomer material;
  a middle layer 350 formed by the metal insert; and
  an outer layer 354 of elastomer material.

Each of these three layers extends over a complete turn about the axis 22 and is of thickness that is constant in the radial direction on going around the axis 22.

In this embodiment, the properties of the bearing are thus the same in all radial directions around the axis. In particular, the stiffness Kz of the bearing in the vertical direction has the same value as its stiffness Ky along the direction Y.

Figure 8:
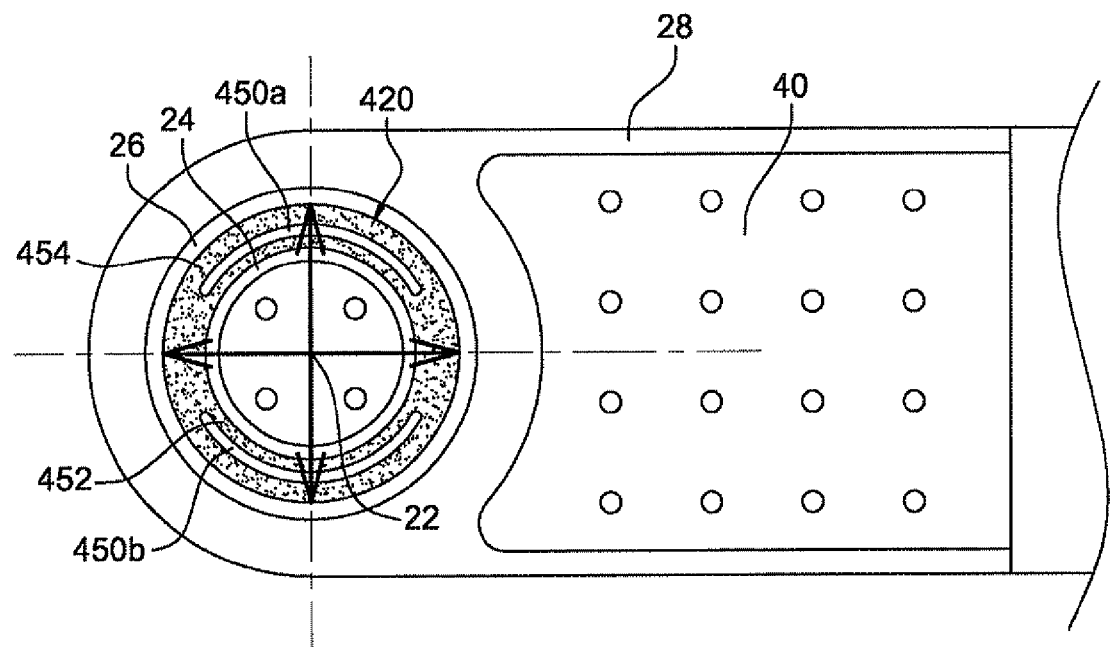

A fourth embodiment is shown in FIG. 8. Here the bearing 420 has two partial inserts 450a and 450b that are embedded in the elastomer material (the inserts may be made of metal or of composite material). Each partial insert is in the form of a cylindrical sector and it occupies a fraction only of a turn around the axis 22, about 100° about this axis in this example. The two inserts lie geometrically on the same cylinder. One of the inserts occupies an upper portion and the other a lower portion. Each insert is itself symmetrical about a plane parallel to the XZ plane and is symmetrical to the other insert about a plane parallel to the XY plane.

Once again, in section in a plane parallel to the XZ plane, there can thus be seen three superposed layers in the bearing in this order going along the radial direction from the axis 22 between the two rings:
  an inner layer 452 of elastomer material;
  a middle layer formed by each of the inserts 450a, 450b; and
  an outer layer 454 of elastomer material.

However, in a section on a horizontal plane, the bearing presents in a radial direction only two layers, i.e. the inner layer 452 and the outer layer 454 of elastomer material, said layers then forming a single layer.

In this embodiment, the properties of the bearing are therefore not the same in all radial directions around the axis. In particular, the stiffness Kz of the bearing in the vertical direction has a value that is greater than its stiffness Ky in the direction Y.

In-depth studies have been performed on the crash behavior of various configurations for the aircraft, one of them complying with the first embodiment of the invention.

It has been found that the concept of combining a hinge connection with a degree of freedom to move radially in translation in a horizontal direction relative to the fuselage enables an additional amount of energy to be absorbed during the breakage dynamics in the event of a crash. Because of the very nature of the junction between the frame and the cross-member, this hinge design thus provides an advantageous technique in the search for absorbing energy. In addition, it would appear that these advantages extend more generally to the invention, and in particular to the other embodiments described above.

More precisely, it is found that the invention makes it possible to solve simultaneously the following two problems. Under static conditions, and under normal circumstances of airplane use, the invention serves to reduce the forces in the frame, while allowing the structure to deform in non-permanent manner. That is why it is useful to make provision for elasticity in rotation about the axis x and in translation along the direction Y.

Under dynamic conditions, in particular in the event of a crash, the invention improves the breakage dynamics of the various elements making up the structure of the floor by initiating movements in directions that provide additional potential for absorbing energy. This takes place in particular in the direction Y, i.e. the direction of the cross-members 14. It is found that during a crash simulation, the cross-members of the aircraft of the invention bend (their centers move down relative to their ends, which move up) more than in an aircraft that is not in accordance with the invention. In addition, the vertical cross-section of the fuselage in the YZ plane becomes oval in shape, thereby increasing its transverse horizontal dimension in the direction Y, with this taking place to a greater extent than in the reference aircraft. This same section flattens less in the vertical direction than in the reference aircraft, with the stroke of the fuselage wall level with the posts 18 being diminished. The degree of freedom offered by the bearing along the direction Y enables the fuselage section to become oval and thus to modify its general behavior. A main consequence of this ovalization is to retard energy absorption in the low portion of the fuselage, thereby transforming the remaining height of the fuselage into an additional energy absorption zone.

For this behavior in the event of a crash, it is advantageous for the bearing to include a zone that provides energy absorption by collapsing when being subjected to a load exceeding a predetermined value. This value is much greater than the extreme load used for dimensioning the structure in the static range. Since the load is directed along the axis Y, collapse will take place in that direction. In other words, the bearing is arranged to collapse when the magnitude of stress applied to the bearing in a longitudinal direction of the cross-member exceeds a predetermined threshold, referred to as the dynamic threshold, which threshold is greater than a predetermined threshold, referred to as the static threshold, that constitutes the maximum for said magnitude under normal circumstances of use for the aircraft.

The bearing in each of the above-described embodiments, and in particular for the embodiment of FIG. 6, may be configured so as to present this property, e.g. by suitably selecting the material(s) of the bearing and/or its dimensions. By way of example, its material may be an elastomer. In this context, amongst others, provision may be made for the bearing to present flexibilities, e.g. elasticities, that are different, at least in the two directions Y and Z.

However, provision may also be made to modify any of the above-described bearings so as to add thereto at least one portion that forms an additional energy absorption zone. This portion may be made for example out of a material that is different from the material(s) of the remainder of the bearing. It might likewise be an elastomer. By way of example, this portion may form an extension of the bearing in the direction Y that is arranged to receive the above-mentioned load. Otherwise, it could be cylindrical in shape analogous to the shape of the other portions of the bearing, where appropriate.

Naturally, it is not essential for the portion of the bearing that is to collapse in the event of a crash to be made of a material that is elastic. It suffices for the material to present flexibility in the direction Y. It is energy absorption that is looked for under such circumstances and not the fact that the parts can subsequently return to their original configuration, which would be pointless after a crash. That said, it remains possible to envisage using an elastomer for this purpose.

Naturally, numerous modifications may be made to the invention without going beyond its ambit.

The bearing may comprise at least two mutually different flexible materials, not counting any insert.

Provision may be made for the or each insert to extend over half a turn or one-fourth of a turn.

The or each insert may be configured so that the elasticity of the bearing in the axial direction is different from its elasticity in the radial direction.

In another embodiment, provision may be made for the bearing of the invention to connect together not the cross-member and the frame, but rather the cross-member to each of the posts 18. Provision also may be made for the cross-member to be connected to the frame at each of its ends via a bearing of the invention and to each of the posts via a bearing of the invention.

The shape of the bearing may be modified and it may be given a shape other than a shape that is cylindrical or annular.

The invention claimed is:
1. An aircraft, comprising:
at least one floor cross-member of the aircraft;
at least one support carrying the cross-member; and
at least one bearing including at least one flexible material and connecting the cross-member to the support,
the bearing and the flexible material each being fixed to the cross-member,
the bearing and the flexible material each being fixed to the support,
the cross-member being movable with respect to the support by means of the material deforming,
wherein the flexible material is a first material, the bearing includes at least one insert made of a second material interposed between two layers of the first material, the second material being more rigid than the first material.

2. An aircraft according to claim 1, wherein the flexible material is elastic.

3. An aircraft according to claim 1, wherein the or each insert extends over a portion only of a turn around a main axis of the bearing.

4. An aircraft according claim 1, wherein the bearing is configured in such a manner as to present different elasticities in at least two directions that are radial relative to a main axis of the bearing.

5. An aircraft according to claim 1, wherein the bearing presents an annular shape.

6. An aircraft according to claim 1, wherein the bearing presents an axis defined by the annular shape, which axis extends in a horizontal direction perpendicular to a general direction of the cross-member.

7. An aircraft according to claim 1 having two concentric rings between which the bearing is interposed, the rings being connected respectively to the cross-member and to the support, with one of the two rings preferably forming a housing for receiving the bearing.

8. An aircraft according to claim 1, wherein the support comprises a frame connected to the cross-member at at least one end of the cross-member.

9. An aircraft according to claim 1, wherein the support comprises at least one post connected to the cross-member at a distance from the ends of the cross-member.

10. An aircraft according to claim 1, wherein the bearing is arranged to collapse when the intensity of stress on the bearing in a longitudinal direction of the cross-member exceeds a predetermined threshold, said threshold being greater than a threshold predetermined as a maximum for said magnitude under normal circumstances of use of the aircraft.

11. An aircraft according to claim 1, wherein the first material or the second material is an elastomer.

12. An aircraft according to claim 5, wherein the bearing presents a cylindrical shape.

13. An aircraft according to claim 8, wherein the support comprises a frame connected to the cross-member at both ends of the cross-member.

14. An aircraft according to claim 1, further comprising a floor.

15. An aircraft, comprising:
at least one floor cross-member of the aircraft;
at least one support carrying the cross-member; and
at least one bearing including at least one flexible material and connecting the cross-member to the support, the bearing carrying the cross-member, the bearing and the material each being fixed to the support,
the cross-member being movable with respect to the support by means of the material deforming,
wherein the bearing is a cylindrical annulus with a main section of the bearing being generally U-shaped, with free ends of branches of the U-shaped bearing directed away from a main axis parallel to a longitudinal direction of the aircraft, and
wherein the flexible material is a first material, the bearing includes at least one insert made of a second material interposed between two layers of the first material, the second material being more rigid than the first material.

16. An aircraft, composing:
at least one floor cross-member of the aircraft;

at least one support carrying the cross-member; and at least one bearing including at least one flexible material and connecting the cross-member to the support, the bearing and the flexible material being fixed to the cross-member, the bearing and the flexible material each being fixed to the support, the cross-member being moveable with respect to the support by means of the material deforming, wherein the bearing includes a ring including a plane-shaped cheekplate that closes one of the faces of the ring, the cheekplate fastening the ring to a wall of the support, and wherein the flexible material is a first material, the bearing includes at least one insert made of a second material interposed between two layers of the first material, the second material being more rigid than the first material.

17. An aircraft, comprising:

at least one floor cross-member of the aircraft;

at least one support carrying the cross-member; and at least one bearing including at least on flexible material and connecting the cross-member to the support, the bearing and the flexible material each being fixd to the cross-member, the bearing and the flexible material each being fixed to the support, the bearing further comprising a plane rib extending in a plane perpendicular to a horizontal transverse direction of the aircraft, wherein the flexible material is a first material, the bearing includes at least one insert made of a second material interposed between two layers of the first material, the second material being more rigid than the first material.

* * * * *

UNITED STATES PATENT AND TRADEMARK OFFICE
CERTIFICATE OF CORRECTION

PATENT NO. : 8,936,215 B2  Page 1 of 1
APPLICATION NO. : 13/321688
DATED : January 20, 2015
INVENTOR(S) : Guillaume Gallant et al.

It is certified that error appears in the above-identified patent and that said Letters Patent is hereby corrected as shown below:

In the Claims

In Col. 8, line 7, Claim 2, "wherein the flexable" should be ---wherein the flexible---.

In Col. 8, line 51, Claim 15, "one flexable material" should be ---one flexible material---.

In Col. 8, line 66, Claim 16, "An aircraft, composing:" should be ---An aircraft, comprising:---.

Signed and Sealed this
Second Day of June, 2015

Michelle K. Lee
*Director of the United States Patent and Trademark Office*